E. GRATTEN.

Feed Rack.

No. 64,759.

Patented May 14, 1867.

Witnesses:

Inventor:

United States Patent Office.

E. GRATTEN, OF WILLIAMSTOWN, MICHIGAN.

Letters Patent No. 64,759, dated May 14, 1867.

---

FEED-RACK.

---

The Schedule referred to in these Letters Patent and making part of the same.

---

TO ALL WHOM IT MAY CONCERN:

Be it known that I, E. GRATTEN, of Williamstown, Ingham county, Michigan, have invented certain new and useful Improvements in Feed-Racks; and I hereby declare that the following is a true, full, and exact description of the same, reference being had to the accompanying drawings, and to the letters of reference marked thereon. In the annexed drawings, which make a part of this specification—

Figure 1:
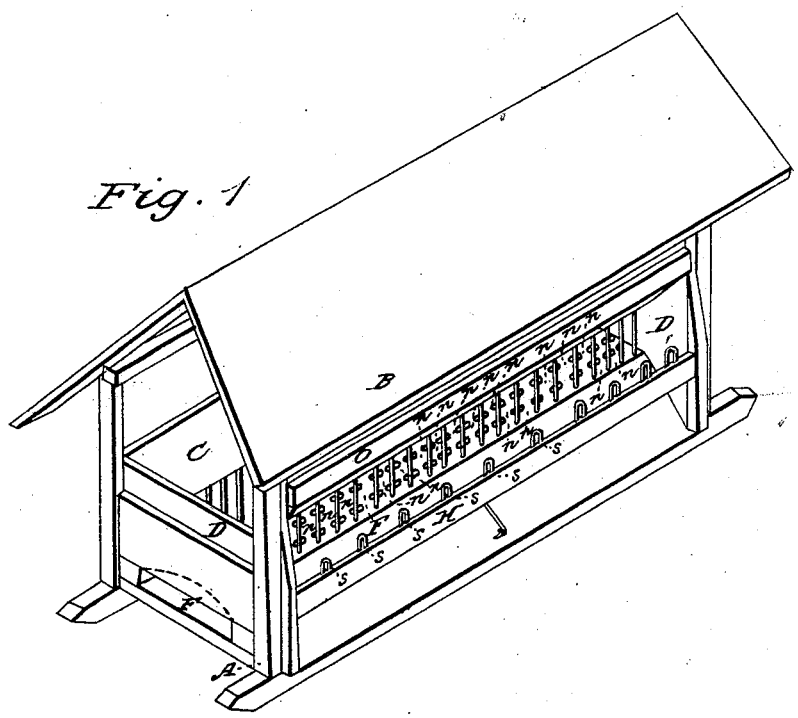
Figure 1 represents my feed-rack in perspective.
Figure 2:
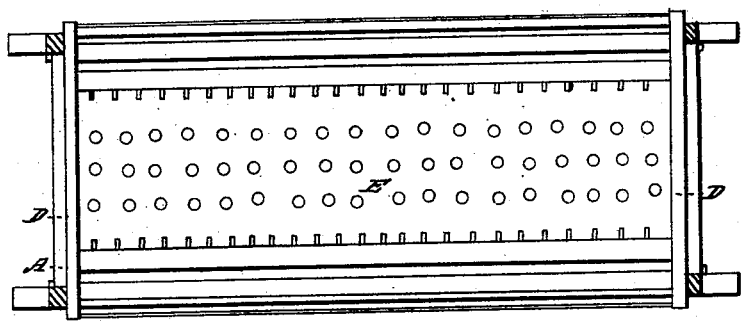
Figure 2 is a plan view of the same with the roof removed.

The letter A, fig. 1, designates the fold, which is oblong in form and covered with the roof B. Extending the full length of the fold A is the trough for holding hay, fodder, or other rough food. This trough consists of sides C, the ends D, and perforated bottom E. The object of these perforations is to let the seed from the hay pass into a receptacle, F, placed beneath the bottom E, from whence it can be taken through openings G, (see dotted lines in fig. 1.) In order to render the hay accessible to the sheep a rack is constructed by using a series of bars, $n$, of wood or metal, the upper ends of said bars being inserted into the lower edge of sides C, and the lower ends in the bottom E. As my feed-rack is designed to feed larger stock as well as sheep, the trough O is provided, the inner edge of which rests against the side C, and being pivoted in the ends D can be turned inward so as to discharge any refuse matter that may have accumulated at its bottom. H represents the sheep-trough, which is formed of two boards so adjusted together that the inner side may be represented by the letter V. The outer edge of trough H is supplied with a series of metal loops, S, the object of which is to separate the sheep while feeding and to prevent their getting into the trough and defiling it. The trough H is pivoted in the ends D and can be turned outwards for the purpose of cleaning it. It will be remarked that the sides C at their ends work in grooves cut in the end pieces D, and can be raised or lowered as the case may require.

The advantages of my sheep-rack are, first, the facility in cleaning the troughs; secondly, its adaptation to different kinds of stock; and thirdly, in the arrangement for saving the seed of the hay on which the animals are fed; fourthly, in the immovable position of the troughs while the animals are feeding, the lower one being held by a hook attached to its bottom which enters an eye on the frame; fifthly, the adjustability of trough O, by which any grain left in it after feeding the larger stock can be emptied in the lower trough H for the benefit of the sheep.

Having thus described my invention, what I claim, and desire to secure by Letters Patent, is—

1. The combination of troughs O and H, constructed and operating in the manner and for the purpose herein set forth.

2. The receptacle F, constructed as and for the purpose specified.

3. The troughs O and H, in combination with the adjustable sides C, and rack-bars $n$, and the perforated bottom F, the whole constructed, arranged, and operating as and for the purpose herein specified.

In testimony whereof I set my hand in presence of two witnesses.

E. GRATTEN.

Witnesses:
RALPH WILLIAMS,
L. F. GLAPBRAK.